US010741876B2

(12) United States Patent
Fujihara

(10) Patent No.: US 10,741,876 B2
(45) Date of Patent: Aug. 11, 2020

(54) POSITIVE ELECTRODE MATERIAL FOR NOAQUEOUS SECONDARY BATTERIES, AND NONAQUEOUS SECONDARY BATTERIES USING SAME

(71) Applicant: NICHIA CORPORATION, Anan-shi, Tokushima (JP)

(72) Inventor: Keisuke Fujihara, Tokushima (JP)

(73) Assignee: NICHIA CORPORATION, Anan-shi (JP)

(*) Notice: Subject to any disclaimer, the term of this patent is extended or adjusted under 35 U.S.C. 154(b) by 113 days.

(21) Appl. No.: 15/952,185

(22) Filed: Apr. 12, 2018

(65) Prior Publication Data
US 2018/0301748 A1 Oct. 18, 2018

(30) Foreign Application Priority Data

Apr. 13, 2017 (JP) ................................. 2017-079697

(51) Int. Cl.
C01B 33/06 (2006.01)
C01G 53/00 (2006.01)
H01M 4/36 (2006.01)
H01M 4/505 (2010.01)
H01M 4/525 (2010.01)
H01M 4/02 (2006.01)
H01M 10/0525 (2010.01)
H01M 4/58 (2010.01)

(52) U.S. Cl.
CPC ......... *H01M 10/0525* (2013.01); *C01B 33/06* (2013.01); *C01G 53/50* (2013.01); *H01M 4/364* (2013.01); *H01M 4/505* (2013.01); *H01M 4/525* (2013.01); *H01M 4/58* (2013.01); *C01P 2002/20* (2013.01); *C01P 2004/61* (2013.01); *C01P 2004/62* (2013.01); *C01P 2006/40* (2013.01); *H01M 2004/021* (2013.01); *H01M 2004/028* (2013.01)

(58) Field of Classification Search
None
See application file for complete search history.

(56) References Cited

U.S. PATENT DOCUMENTS

2003/0082453 A1  5/2003 Numata et al.
2015/0044513 A1* 2/2015 Endoh ............... H01M 4/131
                                                    429/7

FOREIGN PATENT DOCUMENTS

JP    H08-222219 A    8/1996
JP    2003142101 A    5/2003
(Continued)

Primary Examiner — Ula C Ruddock
Assistant Examiner — Amanda Rosenbaum
(74) Attorney, Agent, or Firm — Hunton Andrews Kurth LLP

(57) ABSTRACT

A positive electrode material for nonaqueous secondary batteries includes lithium transition metal composite oxide particles containing at least one of cobalt and nickel; and titanium silicide particles. The lithium transition metal composite oxide particles have a layer structure. The lithium transition metal composite oxide particles and the titanium silicide particles are present as particles substantially independent from each other. The titanium silicide particles have an average particle diameter of 4.0 μm or less. The titanium silicide particles are contained at a content ratio of titanium of 1.2 mol % or less with respect to the lithium transition metal composite oxide particles.

15 Claims, 3 Drawing Sheets

(56) References Cited

FOREIGN PATENT DOCUMENTS

| WO | 2013/024739 A1 | 2/2013 | |
| WO | WO-2013024739 A1 * | 2/2013 | ............. C01G 53/50 |

* cited by examiner

POSITIVE ELECTRODE MATERIAL FOR NOAQUEOUS SECONDARY BATTERIES, AND NONAQUEOUS SECONDARY BATTERIES USING SAME

CROSS-REFERENCE TO RELATED APPLICATION

This application claims priority under 35 U. S. C. § 119 to Japanese Patent Application No. 2017-079697, filed Apr. 13, 2017, the disclosure of which is hereby incorporated by reference in its entirety.

BACKGROUND

The present disclosure relates to a positive electrode material for nonaqueous secondary batteries and nonaqueous secondary batteries using the same.

Nonaqueous secondary batteries, such as lithium ion secondary batteries or the like, are widely used as power sources for small-scale devices, such as mobile phones, notebook computers, or the like. A nonaqueous secondary battery is capable of providing a high operating voltage, and therefore may be of use as a power source for large-scale devices, such as electric vehicles or the like.

An example of active material for a nonaqueous electrolytic secondary battery contains lithium transition metal oxide particles and transition metal silicide sintered on surfaces of the lithium transition metal oxide particles. WO2013-024739 describes an example of active material used to provide high output characteristics. As described in WO2013-024739, this material is formed by attaching 1 mol % of $TiS_2$ particles to the surface of a lithium-nickel composite oxide using a device having a high mechanical energy and then sintering the compound.

SUMMARY

An exemplary embodiment of the present disclosure provides a positive electrode material for nonaqueous secondary batteries having a high initial charge/discharge efficiency and a high thermal stability at a high voltage, and a nonaqueous secondary battery containing such a positive electrode material.

A positive electrode material for nonaqueous secondary batteries in an exemplary embodiment of the present disclosure includes lithium transition metal composite oxide particles containing at least one of cobalt and nickel. The lithium transition metal composite oxide particles have a layer structure. The lithium transition metal composite oxide particles and the titanium silicide particles are present as particles substantially independent from each other. The titanium silicide particles have an average particle diameter of 4.0 μm or less. The titanium silicide particles are contained at a content ratio of titanium of 1.2 mol % or less with respect to the lithium transition metal composite oxide particles.

Use of a positive electrode material for nonaqueous secondary batteries in an exemplary embodiment of the present disclosure may realize a nonaqueous secondary battery having a high thermal stability.

DETAILED DESCRIPTION

Figure 1:
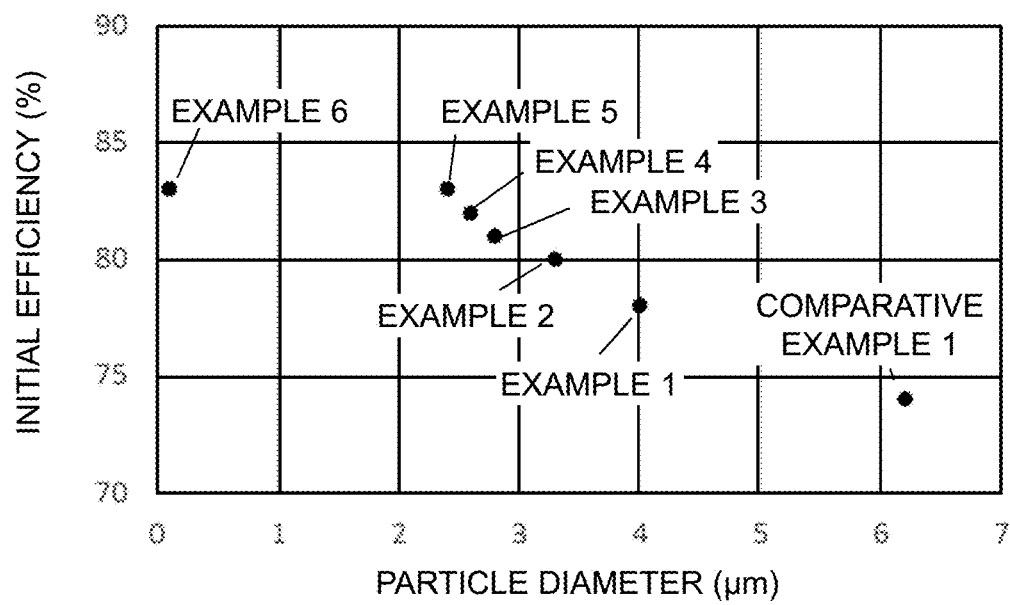
FIG. 1 is a graph showing the relationship between the average particle diameter of a titanium silicide particles in a positive electrode material for nonaqueous secondary batteries and the initial efficiency in each of examples 1 through 6 and comparative example 2.

The present inventor studied problems occurring in the case where a nonaqueous secondary battery formed by use of a positive electrode material for nonaqueous secondary batteries that contains lithium transition metal composite oxide particles containing at least one of cobalt and nickel in a composition thereof and having a layer structure is used at a high charge voltage. As a result, the present inventor found the following: when the temperature of the nonaqueous secondary battery charged at a high voltage becomes high, heat may be generated due to decomposition of the electrolytic solution, and the active material may become thermally unstable and the thermal stability of the nonaqueous secondary battery may be decreased. Based on such knowledge, the present inventor conceived a novel positive electrode material for nonaqueous secondary batteries. Hereinafter, embodiments of a positive electrode material for nonaqueous secondary batteries, a nonaqueous secondary battery, and a method for producing the positive electrode material for nonaqueous secondary batteries according to the present disclosure will be described.

The following exemplary embodiments are illustrative of the technical idea of the present disclosure, but the present disclosure is not limited to the embodiments described below. If an embodiment describes a plurality of substances corresponding to each of components contained in a composition, the content ratio of each of the components is the total content ratio of the plurality of substances contained in the composition, unless otherwise specified. The average particle diameter of a lithium transition metal composite oxide particles, and the average particle diameter of a titanium silicide particles, each correspond to a 50% cumulative diameter on a volumetric basis from the small-diameter side in a diameter distribution measured by a laser scattering method.

(Positive Electrode Material for Nonaqueous Secondary Batteries)

A positive electrode material for nonaqueous secondary batteries according to the present disclosure contains lithium transition metal composite oxide particles and titanium silicide particles. Hereinafter, the positive electrode material for nonaqueous secondary batteries will be described in detail.

[Lithium Transition Metal Composite Oxide Particles]

The positive electrode material for nonaqueous secondary batteries contains lithium transition metal composite oxide particles as a lithium transition metal composite oxide. The transition metal is at least one of cobalt and nickel, and the lithium transition metal composite oxide particles has a layer structure including a space that allows lithium ions to be inserted or removed. Specifically, the lithium transition metal composite oxide particles have a composition represented by the following formula (1).

  (1)

In formula (1),
0.95≤a≤1.5
0≤x≤1
0≤y≤1
x+y≠0
0≤z≤0.35
0≤w≤0.02
x+y+z+w≤1

M1 is at least one element selected from the group consisting of Al and Mn, and M2 is at least one element selected from the group consisting of Mg, Ti, Zr, W, Ta, Nb and Mo.

Regarding the lithium transition metal composite oxide particles, there is a tendency that as the amount of lithium is larger, the output characteristics are improved but it is more difficult to synthesize the lithium transition metal composite oxide. In consideration of this, the value range of a in formula (1) is set to 0.95≤a≤1.5. The value range of a is preferably 0.98≤a≤1.25, and more preferably 1≤a≤1.15.

The lithium transition metal composite oxide particles contain at least one of cobalt and nickel as a transition metal. From the points of view of the costs and the structural stability of the lithium transition metal composite oxide during charge at a high voltage, the value range of x in formula (1) is set to 0≤x≤1 and the value range of y in formula (1) is set to 0≤y≤1. In the case where cobalt is contained, the cost is high but the lithium transition metal composite oxide particles is structurally stable even when being charged at a high voltage. Therefore, the value range of x and the value range of y are preferably 0≤x≤0.2 and 0.8≤y≤1, and more preferably 0≤x≤0.1 and 0.9≤y≤1. In the case where nickel is contained, the cost is lower but the lithium transition metal composite oxide particles is structurally more unstable when being charged at a high voltage, as compared with the case where cobalt is contained. Therefore, the value range of x and the value range of y are preferably 0.3≤x≤0.8 and 0.1≤y≤0.45, and more preferably 0.3≤x≤0.65 and 0.2≤y≤0.4.

The lithium transition metal composite oxide particles may contain at least one element M1 selected from the group consisting of aluminum and manganese. From the points of view of the charge and discharge capacities and the structural stability of the lithium transition metal composite oxide, the value range of z in formula (1) is set to 0≤z≤0.35. In the case where cobalt is contained, the value ranges of x, y and z are preferably 0≤x≤0.2, 0.8≤y≤1, and 0≤z≤0.1, and more preferably 0≤x≤0.1, 0.9≤y≤1, and 0≤z≤0.05. In the case where nickel is contained, the value ranges of x, y and z are preferably 0.3≤x≤0.8, 0.1≤y≤0.45, and 0≤z≤0.35.

The lithium transition metal composite oxide particles may further contain at least one element M2 selected from the group consisting of magnesium, titanium, zirconium, tungsten, tantalum, niobium and molybdenum. The content ratio of element M2 may be appropriately determined in consideration of the characteristics required of the nonaqueous secondary battery. It is preferred that the content ratio of element M2 is not very large because element M2 reduces a capacity of the nonaqueous secondary battery. In consideration of the above, the value range of w in formula (1) is set to 0≤w≤0.05. In consideration of the balance of various characteristics, the value range of w is preferably 0≤w≤0.02.

The positive electrode material for nonaqueous secondary batteries may contain, as a sub component, lithium transition metal composite oxide particles having a structure, other than a layer structure, that is capable of desorbing or adsorbing lithium ions. Examples of the lithium transition metal composite oxide particles having a structure other than a layer structure include a lithium-manganese composite oxide having a spinel structure, iron lithium phosphate having an olivine structure, and the like. The content ratio of the lithium transition metal composite oxide having a layer structure represented by formula (1) in the positive electrode material for nonaqueous secondary batteries is, for example, 90% by weight or grater, and preferably 95% by weight, with respect to the entirety of the positive electrode material for nonaqueous secondary batteries. In the case where the positive electrode material for nonaqueous secondary batteries contains a lithium transition metal composite oxide having a structure other than a layer structure, the content ratio of the lithium transition metal composite oxide having a structure other than a layer structure is, for example, 10% by weight or less, and preferably 5% by weight or less, with respect to the entirety of the positive electrode material for nonaqueous secondary batteries.

The average particle diameter of the lithium transition metal composite oxide particles is, for example, 3 μm or greater and 45 μm or less, and preferably 5 μm or greater and 35 μm or less, from the point of view of a packing density of the active material layer.

[Titanium Silicide Particles]

Titanium silicide particles are chargeable at a high voltage, and suppress the lithium transition metal composite oxide in contact with an electrolytic solution from causing, at a high temperature, a rapid structural change or decomposition that accompanies heat generation, thus to improve the thermal stability of the positive electrode material for nonaqueous secondary batteries. As described below, when the lithium transition metal composite oxide is subjected to differential scanning calorimetry in a state of being put into contact with an electrolytic solution and thus being charged as a positive electrode, rapid heat generation is observed in a temperature range of 280° C. to 300° C. This indicates that a structural change, decomposition or the like of the lithium transition metal composite oxide is caused rapidly at such a temperature. Once such rapid heat generation is caused, the structural change, the decomposition or the like of the lithium transition metal composite oxide is further promoted.

As a result of studies and experiments performed by the present inventor, it has been found that such rapid heat generation may be suppressed by incorporating titanium silicide particles into the positive electrode material for nonaqueous secondary batteries. A reason why the titanium silicide particles suppress heat generation is not clear at this point. However, it is considered that such rapid heat generation is related with a reaction of the positive electrode material for nonaqueous secondary batteries and hydrogen fluoride, which is caused by decomposition of an electrolyte containing fluorine-containing anion (e.g., $LiPF_6$) in a nonaqueous electrolytic solution. A conceivable reason why the titanium silicide particles suppress the rapid heat generation is that the titanium silicide particles are dissolved from the positive electrode material into the nonaqueous electrolytic solution and is reacted with hydrogen fluoride to capture hydrogen fluoride.

According to detailed researches made by the present inventor, the above-described rapid heat generation is suppressed by incorporation of the titanium silicide particles. However, it has been found that if the amount of the titanium silicide particles is excessively large, the initial efficiency (ratio of the initial discharge amount with respect to the initial charge amount) of the nonaqueous secondary battery is decreased. It has been found that the initial efficiency is especially influenced by the content ratio and the average particle diameter of the titanium silicide particles.

Regarding the content ratio of the titanium silicide particles, it is preferred that the content ratio of titanium silicide, which is the content ratio of titanium, is 1.2 mol % or less with respect to the lithium transition metal composite oxide particles. In the case where the content ratio is greater than 1.2 mol %, the initial efficiency of the nonaqueous secondary battery containing the positive electrode material for nonaqueous secondary batteries is decreased. The content ratio of titanium silicate is more preferably 0.1 mol % or greater and 0.75 mol % or less, and still more preferably 0.1 mol % or greater and 0.5 mol % or less.

It is preferred that the average particle diameter of the titanium silicide particles is 4.0 µm or less. In the case where the average particle diameter is larger than 4.0 µm, the initial efficiency is decreased. The average particle diameter of the titanium silicide particles is more preferably 0.1 µm or greater and 3.0 µm or less, and still more preferably 0.1 µm or greater and 2.4 µm or less.

The content ratio and the average particle diameter of the titanium silicide particles are considered to be related with the amount of titanium silicide eluted into the nonaqueous electrolytic solution. In the case where the average particle diameter of the titanium silicide particles is too small, the amount of titanium silicide eluted into the nonaqueous electrolytic solution is relatively decreased due to the surface of the titanium silicide particles being oxidized. By contrast, in the case where the average particle diameter of the titanium silicide particles is too large, it is considered that the amount of titanium silicide eluted into the nonaqueous electrolytic solution is increased, and the eluted titanium silicide is reacted with the lithium transition metal composite oxide to change the properties of the active surface of the lithium transition metal composite oxide.

The titanium silicide particles contain, as a main component, titanium silicide represented by the formula $TiSi_2$. The titanium silicide particles may contain titanium silicide having another composition by which the composition ratio of titanium and silicon is not 1:2. The surfaces of the titanium silicide particles are covered with an oxide film.

As described above, it is considered that the titanium silicide particles are eluted into the nonaqueous electrolytic solution to capture a substance derived from the anion in the electrolytic solution and thus to suppress rapid heat generation. Since the titanium silicide particles are not considered to be directly reacted with the lithium transition metal composite oxide particles, it is preferred that the titanium silicide particles and the lithium transition metal composite oxide particles are present as particles substantially independent from each other in the positive electrode material. It is considered that since the titanium silicide particles are present as particles independent from the lithium transition metal composite oxide particles, the elution of the titanium silicide particles into the electrolytic solution is promoted without the titanium silicide particles being reacted with the lithium transition metal composite oxide particles. The expression that "the titanium silicide particles are present as particles substantially independent" indicates that, for example, the titanium silicide particles and the lithium transition metal composite oxide particles are not observed as being melted or sintered and integrated together. Specifically, in the case where the average particle diameter of the titanium silicide particles and the average particle diameter of the lithium transition metal composite oxide particles are different from each other, the above expression indicates that a peak derived from the titanium silicide particles and a peak derived from the lithium transition metal composite oxide particles are observed in a particle distribution of the positive electrode material. The above expression also indicates that in the case where element mapping is performed by use of, for example, a scanning electronic microscope-energy diffusive x-ray spectroscopic analyzer, the titanium silicide particles and the lithium transition metal composite oxide particles are observed as being contained as particles substantially independent from each other.

The titanium silicide particles may be a commercially available product. Alternatively, a material containing titanium and a material containing silicon may be prepared to synthesize the titanium silicide particles.

[Other Additives]

The positive electrode material for nonaqueous secondary batteries may contain, in addition to the lithium transition metal composite oxide particles and the titanium silicide particles, other general materials usable to form a positive electrode material. Specifically, the positive electrode material for nonaqueous secondary batteries may contain a conductive additive, a binder, a solvent or the like.

(Method for Producing the Positive Electrode Material for Nonaqueous Secondary Batteries)

The positive electrode material for nonaqueous secondary batteries in this embodiment is produced by stirring and mixing the lithium transition metal composite oxide particles and the titanium silicide particles with a force that is strong but does not cause a chemical change to these particles. There is no specific limitation on the method as long as this condition is fulfilled. According to a representative example of production method, the lithium transition metal composite oxide particles and the titanium silicide particles are mixed by a known blade-type stirring device.

[Effect, Etc.]

The positive electrode material for nonaqueous secondary batteries according to the present disclosure contains the titanium silicide particles independently from the lithium transition metal composite oxide particles. This increases the thermal stability of the nonaqueous secondary battery that contains the positive electrode material for nonaqueous secondary batteries and is used at a high charge voltage. Especially in the case where the titanium silicide particles contained in the positive electrode material for nonaqueous secondary batteries have an average particle diameter of 4.0 µm or less and a content ratio (content ratio of titanium) of 1.2 mol % or less with respect to the lithium transition metal composite oxide particles, the decrease in the initial efficiency is suppressed and the thermal stability of the nonaqueous secondary battery is improved.

(Nonaqueous Secondary Battery)

The nonaqueous secondary battery includes a positive electrode, a negative electrode, and a nonaqueous electrolytic solution.

The positive electrode contains the positive electrode material for nonaqueous secondary batteries. Specifically, the positive electrode includes a current collector and a positive electrode mixture layer supported by the current collector. The positive electrode mixture layer contains the above-described positive electrode material for nonaqueous secondary batteries, a conductive additive, a binder and the like.

The negative electrode contains a negative electrode active material. Specifically, the negative electrode includes a current collector and a negative electrode mixture layer supported by the current collector. The negative electrode mixture layer contains a negative electrode active material, a conductive additive, a binder and the like.

The positive electrode and the negative electrode are located so as to be separated from each other by a separator. The positive electrode, the negative electrode and the separator may each be formed of a general material by a general production method usable for a nonaqueous secondary battery, except for the positive electrode material for nonaqueous secondary batteries.

The nonaqueous electrolytic solution contains a nonaqueous solvent, and an electrolyte containing fluorine-containing anion. Examples of the nonaqueous solvent include a cyclic carbonate ester solvent, a chained carbonate ester solvent, a cyclic ether solvent, a chained ether solvent, a cyclic ester solvent, a chained ester solvent, these solvents in the form of a fluoride, and the like.

The electrolyte contains fluorine-containing anion. Specifically, the electrolyte may contain $LiPF_6$, $LiBF_4$, $LiSbF_6$, $LiAsF_6$, $LiSO_3CF_3$, $LiN(SO_2CF_3)_2$ or any other lithium salt containing fluorine-containing anion, independently or as a combination of two or more. An electrolyte other than lithium salt may be contained.

The nonaqueous secondary battery according to the present disclosure is usable at a high charge voltage and has a high thermal stability.

EXAMPLES

Positive electrode material for nonaqueous secondary batteries were produced under various conditions and characteristics thereof were examined. The results will be described below. As the average particle diameter of each of the lithium transition metal composite oxide particles and the titanium silicide particles, a value providing a cumulative value of 50% in a volume distribution measured by a laser scattering method was used. Specifically, the average particle diameter was measured by use of TIB2-NF produced by Japan New Metals Co., Ltd. The composition of each of composite hydroxide and the lithium transition metal composite oxide particles obtained was found by chemical analysis by ICP emission spectroscopy after a sample thereof was dissolved in an inorganic acid.

1. Production of a Positive Electrode Material for Nonaqueous Secondary Batteries Example 1

A composite hydroxide represented by $(Ni_{0.5}Co_{0.2}Mn_{0.3})(OH)_x$ (x=2-3) was obtained by a co-precipitation method. The obtained composite hydroxide and lithium carbonate were mixed such that Li:(Ni+Co+Mn)=1.08:1 to obtain a start material mixture. The obtained start material mixture was sintered at 850° C. for 2.5 hours in an air atmosphere, and then sintered at 960° C. for 8 hours to obtain a sintered body. The obtained sintered body was pulverized and dry-sieved to obtain lithium transition metal composite oxide particles represented by formula $Li_{1.08}Ni_{0.5}Co_{0.2}Mn_{0.3}O_2$ and having an average particle diameter of 17 μm.

The obtained lithium transition metal composite oxide particles and titanium silicide particles having an average particle diameter of 4 μm was mixed by a high-speed shearing mixer such that the content ratio of titanium silicide (the content ratio of titanium) would be 0.5 mol % with respect to the lithium transition metal composite oxide. Thus, a positive electrode material for nonaqueous secondary batteries in example 1 was obtained.

Example 2

A positive electrode material for nonaqueous secondary batteries in example 2 was obtained in substantially the same manner as in example 1 except that the average diameter of the titanium silicide particles was 3.3 μm.

Example 3

A positive electrode material for nonaqueous secondary batteries in example 3 was obtained in substantially the same manner as in example 1 except that the average diameter of the titanium silicide particles was 2.8 μm.

Example 4

A positive electrode material for nonaqueous secondary batteries in example 4 was obtained in substantially the same manner as in example 1 except that the average diameter of the titanium silicide particles was 2.6 μm.

Example 5

A positive electrode material for nonaqueous secondary batteries in example 5 was obtained in substantially the same manner as in example 1 except that the average diameter of the titanium silicide particles was 2.4 μm.

Example 6

A positive electrode material for nonaqueous secondary batteries in example 6 was obtained in substantially the same manner as in example 1 except that the average diameter of the titanium silicide particles was 0.1 μm.

Example 7

A positive electrode material for nonaqueous secondary batteries in example 7 was obtained in substantially the same manner as in example 1 except that the average diameter of the titanium silicide particles was 2.4 μm and that the content ratio of titanium silicide (content ratio of titanium) with respect to the lithium transition metal composite oxide was 0.1 mol %.

Example 8

A positive electrode material for nonaqueous secondary batteries in example 8 was obtained in substantially the same manner as in example 1 except that the average diameter of the titanium silicide particles was 2.4 μm and that the content ratio of titanium silicide (content ratio of titanium) with respect to the lithium transition metal composite oxide was 0.4 mol %.

Example 9

A positive electrode material for nonaqueous secondary batteries in example 9 was obtained in substantially the same manner as in example 1 except that the average diameter of the titanium silicide particles was 2.4 μm and that the content ratio of titanium silicide (content ratio of titanium) with respect to the lithium transition metal composite oxide was 0.75 mol %.

Example 10

A positive electrode material for nonaqueous secondary batteries in example 10 was obtained in substantially the same manner as in example 1 except that the average diameter of the titanium silicide particles was 2.4 μm and that the content ratio of titanium silicide (content ratio of titanium) with respect to the lithium transition metal composite oxide was 1 mol %.

Comparative Example 1

A positive electrode material for nonaqueous secondary batteries in comparative example 1 was obtained in substantially the same manner as in example 1 except that the titanium silicide particles were not incorporated.

Comparative Example 2

A positive electrode material for nonaqueous secondary batteries in comparative example 2 was obtained in substantially the same manner as in example 1 except that the average diameter of the titanium silicide particles was 6.2 μm.

Comparative Example 3

A positive electrode material for nonaqueous secondary batteries in comparative example 3 was obtained in substantially the same manner as in example 1 except that the average diameter of the titanium silicide particles was 2.4 μm and that the content ratio of titanium silicide (content ratio of titanium) with respect to the lithium transition metal composite oxide was 1.5 mol %.

2. Production of the Evaluation Battery

A nonaqueous electrolytic solution secondary battery was produced as follows by use of the positive electrode material for nonaqueous secondary batteries in each of examples 1 through 10 and comparative examples 1 through 3.

[Production of the Positive Electrode]
92 parts by mass of positive material, 3 parts by mass of acetylene black, 5 parts by mass of polyvinylidene fluoride were dispersed in N-methylpyrrolidone to obtain a positive electrode slurry. The obtained positive electrode slurry was applied to a current collector formed of aluminum foil, dried, compression-molded by a roll press and cut into a predetermine size to obtain a positive electrode.

[Production of the Negative Electrode]
97.5 parts by mass of artificial graphite, 1.5 parts by mass of carboxymethylcellulose, and 1.0 parts by mass of styrene-butadiene rubber were dispersed in water to obtain a negative electrode slurry. The obtained negative electrode slurry was applied to a current collector formed of copper foil, dried, compression-molded by a roll press and cut into a predetermine size to obtain a negative electrode.

[Formation of the Nonaqueous Electrolytic Solution]
Ethyl carbonate and methyl ethyl carbonate were mixed at a volumetric ratio of 3:7 to obtain a mixed solvent. Lithium hexafluorophosphate was dissolved in the obtained mixed solvent such that the concentration of lithium hexafluorophosphate would be 1.0 mol % to obtain a nonaqueous electrolytic solution.

[Preparation of the Separator]
A separator formed of porous polyethylene was prepared.

[Assembly of the Nonaqueous Electrolytic Solution Secondary Battery]
The current collectors of the positive electrode and the negative electrode were each provided with a lead electrode and dried at 120° C. in vacuum. Next, the separator was located between the positive electrode and the negative electrode, and the separator, the positive electrode and the negative electrode were accommodated in a bag-like laminate pack. Then, the separator, the positive electrode and the negative electrode were dried at 60° C. in vacuum to remove moisture adsorbed to these members. After this, the above-described nonaqueous electrolytic solution was injected into the laminate pack, and the laminate pack was sealed. Thus, the laminate-type nonaqueous electrolytic solution secondary battery was obtained as a battery for evaluation (also referred to as an "evaluation battery"). The obtained evaluation battery was used to evaluate the following battery characteristics. Hereinafter, the evaluation batteries produced by use of the positive electrode material for nonaqueous secondary batteries in examples 1 through 10 and comparative examples 1 through 3 will be respectively referred to as "secondary batteries in examples 1 through 10 and comparative examples 1 through 3".

[Evaluation of the Charge/Discharge Characteristics]
Each evaluation battery was subjected to constant current/constant voltage charge at a charge voltage of 4.5V and a charge current of 0.5 C (1 C is a current value at which discharge from a fully charged state is finished in 1 hour), and the charge capacity Qc was measured. Next, the evaluation battery was subjected to constant current discharge at a discharge voltage of 2.75 V and a discharge current of 0.5 C, and the discharge capacity Qd was measured. From the obtained values of Qc and Qd, the initial efficiency Pcd (=Qd/Qc) was calculated.

Table 1 shows the average particle diameter and the content ratio of the titanium silicide particles in the positive electrode material for nonaqueous secondary batteries in each of examples 1 through 10 and comparative examples 1 through 3, and the charge capacity, the discharge capacity and the initial efficiency of the evaluation battery produced by use of the positive electrode material for nonaqueous secondary batteries in each of examples 1 through 10 and comparative examples 1 through 3.

Figure 2:
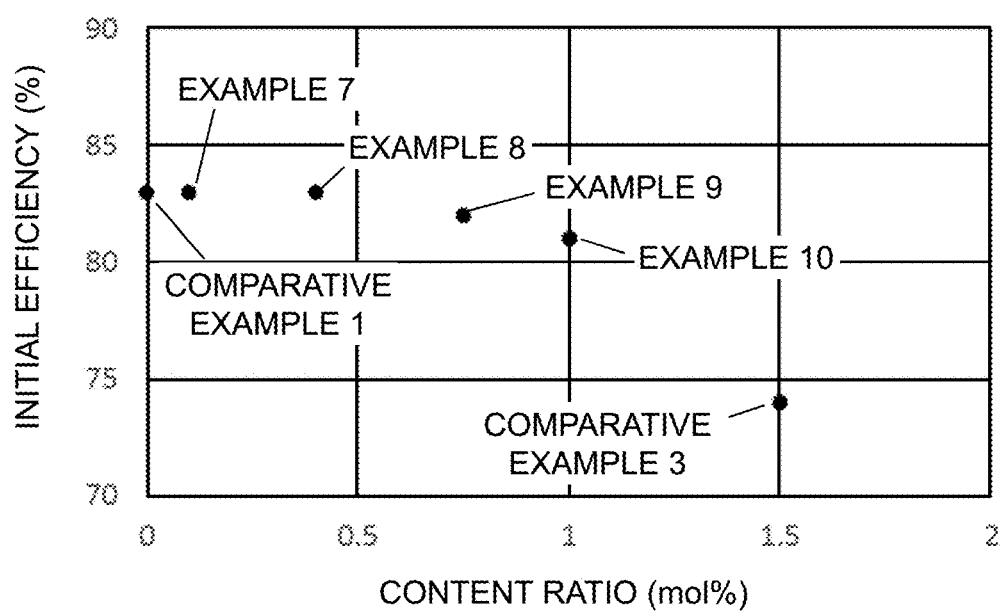
FIG. 2 is a graph showing the relationship between the average particle diameter of a titanium silicide particles in a positive electrode material for nonaqueous secondary batteries and the initial efficiency in each of examples 7 through 10 and comparative example 3.

FIG. 1 shows the relationship between the average particle diameter of the titanium silicide particles in the positive electrode material for nonaqueous secondary batteries and the initial efficiency in each of examples 1 through 6 and comparative example 2. FIG. 2 shows the relationship between the average particle diameter of the titanium silicide particles in the positive electrode material for nonaqueous secondary batteries and the initial efficiency in each of examples 7 through 10 and comparative example 3.

[Evaluation on the Thermal Stability]
Differential scanning calorimetry (DSC) was performed on each of the produced evaluation batteries. First, a lithium ion secondary battery (SUS-type single-electrode battery) was charged and discharged 3 times under the condition of 2.75 to 4.5 V by use of a charge/discharge tester (TOSCAT-3100 produced by Toyo System Co., Ltd.). After the measurement was performed on the single electrode, the lithium ion secondary battery (SUS-type single-electrode battery) was subjected to 4.5 V constant voltage/constant current charge at 25° C. for 15 hours at a charge rate of 0.2 C by use of the above-mentioned charge/discharge tester. Then, the lithium ion secondary battery (SUS-type single-electrode battery) was removed out of the charge/discharge tester and disassembled in a glovebox. The positive electrode was removed and partially cut out (5 mg). The part was put into a pressure-resistant closed pan for DSC together with 4 μm of nonaqueous electrolytic solution to form a sample for DSC measurement. For the differential scanning calorimetry, EXSTAR6000 (produced by Seiko Instruments Inc.) was used, and the heat generation behavior when the temperature was raised from 60° C. to 385° C. at a rate of 5° C./min. was measured.

Figure 3:
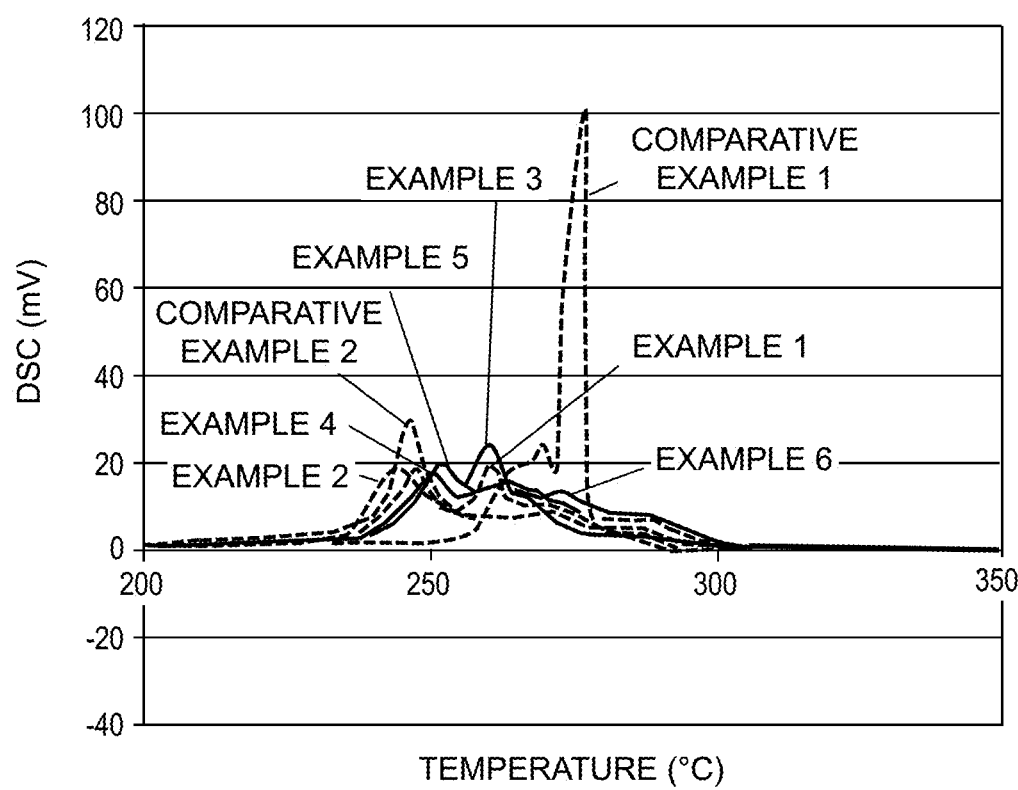
FIG. 3 is a graph showing differential scanning calorimetry results of batteries for evaluation formed by use of the positive electrode material for nonaqueous secondary batteries in each of examples 1 through 6 and comparative examples 1 and 2.
Figure 4:
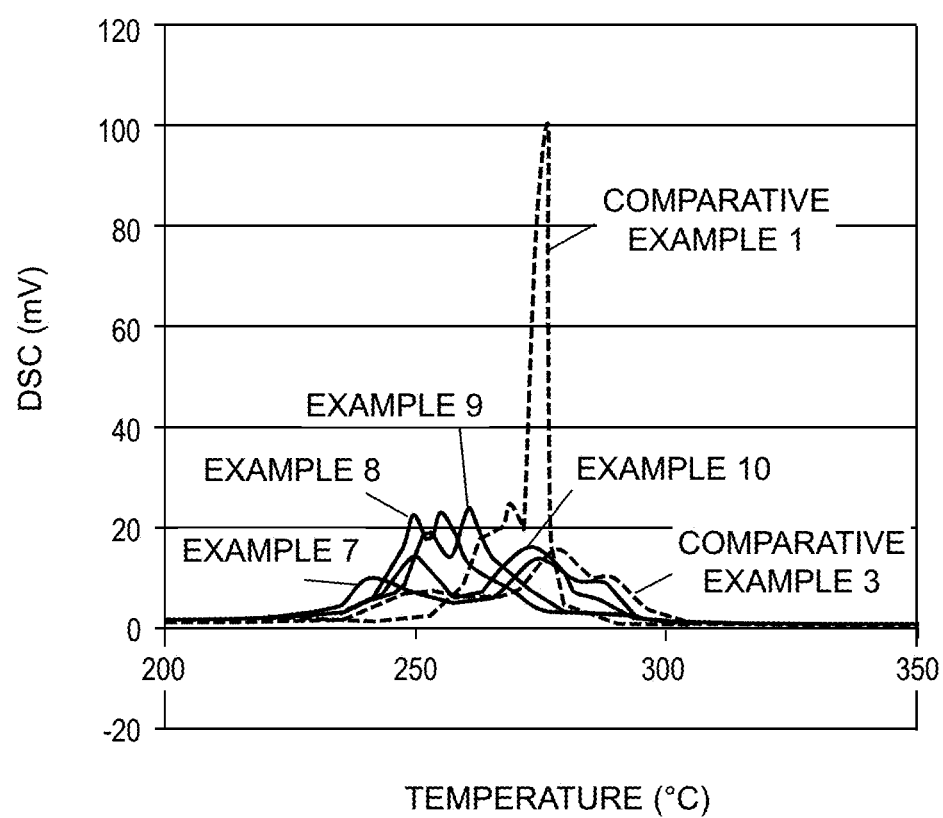
FIG. 4 is a graph showing differential scanning calorimetry results of batteries for evaluation formed by use of the positive electrode material for nonaqueous secondary batteries in each of examples 7 through 10 and comparative examples 1 and 3.

FIG. 3 shows the results of the differential scanning calorimetry performed on the evaluation batteries produced by use of the positive electrode material for nonaqueous secondary batteries in examples 1 through 6 and comparative examples 1 and 2. FIG. 4 shows the results of the differential scanning calorimetry performed on the evaluation batteries produced by use of the positive electrode material for nonaqueous secondary batteries in examples 7 through 10 and comparative examples 1 and 3.

particles is raised for some reason and is kept at 280° C., a reaction such as a structural change, decomposition or the like occurs rapidly and thus a large amount of heat is generated. As a result, the temperature of the nonaqueous secondary battery may possibly be further raised. By contrast, in the case where the positive electrode material for nonaqueous secondary batteries contains titanium silicide particles, a reaction that accompanies heat generation occurs at, or around, 240° C., but the heat generation is dispersed in the range of about 240° C. to about 300° C. Therefore, even in the case where the temperature of the nonaqueous secondary battery containing the positive electrode material for nonaqueous secondary batteries containing the titanium silicide particles is raised for some reason and reaches 240° C., an accelerated temperature rise is considered to be suppressed. Namely, it is considered that incorporation of the titanium silicide particles into the positive electrode material for nonaqueous secondary batteries increases the thermal stability of the nonaqueous secondary battery containing the positive electrode material for nonaqueous secondary batteries.

TABLE 1

| | CONDITIONS (TITANIUM SILICIDE PARTICLES) | | BATTERY CHARACTERISTICS | | |
|---|---|---|---|---|---|
| | AVERAGE PARTICLE DIAMETER (μm) | CONTENT RATIO (mol %) | CHARGE CAPACITY (mAh/g) | DISCHARGE CAPACITY (mAh/g) | INITIAL EFFICIENCY (%) |
| EXAMPLE 1 | 4 | 0.5 | 220 | 171 | 78 |
| EXAMPLE 2 | 3.3 | | 217 | 172 | 80 |
| EXAMPLE 3 | 2.8 | | 215 | 175 | 81 |
| EXAMPLE 4 | 2.6 | | 215 | 177 | 82 |
| EXAMPLE 5 | 2.4 | | 214 | 177 | 83 |
| EXAMPLE 6 | 0.1 | | 214 | 177 | 83 |
| EXAMPLE 7 | 2.4 | 0.1 | 215 | 178 | 83 |
| EXAMPLE 8 | | 0.4 | 214 | 177 | 83 |
| EXAMPLE 9 | | 0.75 | 214 | 176 | 82 |
| EXAMPLE 10 | | 1 | 214 | 173 | 81 |
| COMPARATIVE EXAMPLE 1 | — | — | 215 | 178 | 83 |
| COMPARATIVE EXAMPLE 2 | 6.2 | 0.5 | 223 | 165 | 74 |
| COMPARATIVE EXAMPLE 3 | 2.4 | 1.5 | 221 | 164 | 74 |

As shown in FIG. 3 and FIG. 4, the differential scanning calorimetry results indicate the following. In the secondary battery in comparative example 1, which contains no titanium silicide particles, heat starts to be generated at, or around, 260° C. and is kept generated in a narrow range of about 260° C. to about 280° C. By contrast, in the secondary batteries in examples 1 through 10 and comparative examples 2 and 3, heat is generated generally in a range of 240° C. to 300° C. although the peak temperature varies among the samples. It is considered based on these results that in the positive electrode material for nonaqueous secondary batteries in comparative example 1 with no titanium silicide particles, a structural change, decomposition or the like that accompanies heat generation occurs rapidly at, or around, 280° C.

In the case where the temperature of the nonaqueous secondary battery containing the positive electrode material for nonaqueous secondary batteries with no titanium silicide As shown in Table 1, in the case where the positive electrode material for nonaqueous secondary batteries contains titanium silicide particles, as the particle diameter of the titanium silicide particles is increased, the discharge capacity is decreased, and the initial efficiency is also decreased. Similarly, as the content ratio of the titanium silicide particles is increased, the discharge capacity is decreased and the initial efficiency is also decreased.

In order to increase the initial efficiency to higher than 75%, the particle diameter may be decreased to 4 μm or less as shown in FIG. 1. Namely, in the case where the particle diameter is 4 μm or less, the initial efficiency is 78% or greater, and in the case where the particle diameter is 3 μm or less, the initial efficiency is 80% or greater. In the case where the particle diameter is 2.4 μm or less, the initial efficiency is 83% or greater. As can be seen from Table 1 and FIG. 1, even in the case where the particle diameter is 0.1

μm, the initial efficiency is 83%. Therefore, the lower limit of the particle diameter confirmed by the experiments is 0.1 μm.

As shown in FIG. 2, as the content ratio of the titanium silicide particles is increased, the initial efficiency tends to be decreased. In order to increase the initial efficiency to higher than 75%, it is preferred that the content ratio is 1.5 mol % or less. Specifically, in the case where the content ratio is 1.2 mol % or less, the initial efficiency is 78% or greater, and in the case where the content ratio is 0.75 mol % or less, the initial efficiency is 82% or greater. In the case where the content ratio is 0.5 mol % or less, the initial efficiency is 83% or greater. As can be seen from Table 1 and FIG. 2, even in the case where the content ratio is 0.1 mol %, the initial efficiency is 83%. Therefore, the lower limit of the content ratio confirmed by the experiments is 0.1 mol %.

As can be seen from these results, incorporation of the titanium silicide particles into the positive electrode material for nonaqueous secondary batteries suppresses rapid heat generation in the case where the nonaqueous secondary battery containing the positive electrode material for nonaqueous secondary batteries is kept at a high temperature. It is also seen that selection of the particle diameter and the content ratio of the titanium silicide particles each in an appropriate range suppresses the initial efficiency from being decreased. For example, in the case where a titanium silicide particles having an average particle diameter of 4.0 μm is contained in the positive electrode material for nonaqueous secondary batteries at a content ratio (content ratio of titanium) of 1.2 mol % or less with respect to the lithium transition metal composite oxide particles, the positive electrode material for nonaqueous secondary batteries may realize a nonaqueous secondary battery having a high charge/discharge efficiency and a high thermal stability.

Use of a positive electrode material for nonaqueous secondary batteries provided by an embodiment according to the present disclosure may realize a nonaqueous secondary battery having a high thermal stability. The nonaqueous secondary battery thus provided is preferably usable for a large-scale device required to have a high output and a high energy density such as an electric vehicle or the like.

While exemplary embodiments of the present disclosure have been described, it is understood that the words that have been used are words of description and illustration, rather than words of limitation. The present disclosure may be modified in numerous ways and may assume many embodiments other than those specifically described above. Accordingly, the appended claims are intended to cover all modifications, enhancements, and other embodiments of the present disclosure that fall within the spirit and scope of the invention.

What is claimed is:

1. A positive electrode material for nonaqueous secondary batteries, comprising:
   lithium transition metal composite oxide particles containing at least one of cobalt and nickel; and
   titanium silicide particles;
   wherein the lithium transition metal composite oxide particles have a layer structure;
   wherein the lithium transition metal composite oxide particles and the titanium silicide particles are present as substantially independent particles from each other;
   wherein the titanium silicide particles have an average particle diameter of 4.0 μm or less;
   wherein the titanium silicide particles are contained at a content ratio of titanium of 1.2 mol % or less with respect to the lithium transition metal composite oxide particles; and
   wherein the titanium silicide particles and the lithium transition metal composite oxide particles are not sintered with each other.

2. The positive electrode material for nonaqueous secondary batteries according to claim 1, wherein the average particle diameter of the titanium silicide particles is 0.1 μm or greater and 3.0 μm or less.

3. The positive electrode material for nonaqueous secondary batteries according to claim 1, wherein the average particle diameter of the titanium silicide particles is 0.1 μm or greater and 2.4 μm or less.

4. The positive electrode material for nonaqueous secondary batteries according to claim 1, wherein the content ratio of the titanium silicide particles is 0.1 mol % or greater and 0.75 mol % or less.

5. The positive electrode material for nonaqueous secondary batteries according to claim 1, wherein the content ratio of the titanium silicide particles is 0.1 mol % or greater and 0.5 mol % or less.

6. The positive electrode material for nonaqueous secondary batteries according to claim 1, wherein the lithium transition metal composite oxide particles have a composition represented by the following formula (1):

$$Li_aNi_xCo_yM1_zM2_wO_2 \qquad (1)$$

where
$0.95 \leq a \leq 1.5$; $0 \leq x \leq 1$; $0 \leq y \leq 1$; $x+y \neq 0$; $0 \leq z \leq 0.35$; $0 \leq w \leq 0.02$; $x+y+z+w \leq 1$;
M1 is at least one element selected from the group consisting of Al and Mn; and
M2 is at least one element selected from the group consisting of Mg, Ti, Zr, W, Ta, Nb and Mo.

7. The positive electrode material for nonaqueous secondary batteries according to claim 6, wherein in formula (1), $0.3 \leq x \leq 0.8$, $0.1 \leq y \leq 0.45$, $0 \leq z \leq 0.35$.

8. The positive electrode material for nonaqueous secondary batteries according to claim 6, wherein in formula (1), $1.05 \leq a \leq 1.25$.

9. A nonaqueous secondary battery, comprising:
   a positive electrode containing the positive electrode material for nonaqueous secondary batteries according to claim 1;
   a negative electrode containing a negative electrode active material; and
   a nonaqueous electrolytic solution containing fluorine-containing anion dissolved therein.

10. The positive electrode material for nonaqueous secondary batteries according to claim 2, wherein the average particle diameter of the titanium silicide particles is 0.1 μm or greater and 2.4 μm or less.

11. The positive electrode material for nonaqueous secondary batteries according to claim 2, wherein the content ratio of the titanium silicide particles is 0.1 mol % or greater and 0.75 mol % or less.

12. The positive electrode material for nonaqueous secondary batteries according to claim 2, wherein the content ratio of the titanium silicide particles is 0.1 mol % or greater and 0.5 mol % or less.

13. The positive electrode material for nonaqueous secondary batteries according to claim 2, wherein the lithium transition metal composite oxide particles have a composition represented by the following formula (1):

$$Li_aNi_xCo_yM1_zM2_wO_2 \qquad (1)$$

where $0.95 \leq a \leq 1.5$; $0 \leq x \leq 1$; $0 \leq y \leq 1$; $x+y \neq 0$; $0 \leq z \leq 0.35$; $0 \leq w \leq 0.02$; $x+y+z+w \leq 1$;

M1 is at least one element selected from the group consisting of Al and Mn; and

M2 is at least one element selected from the group consisting of Mg, Ti, Zr, W, Ta, Nb and Mo.

14. The positive electrode material for nonaqueous secondary batteries according to claim 13, wherein in formula (1), $0.3 \leq x \leq 0.8$, $0.1 \leq y \leq 0.45$, $0 \leq z \leq 0.35$.

15. The positive electrode material for nonaqueous secondary batteries according to claim 13, wherein in formula (1), $1.05 \leq a \leq 1.25$.

* * * * *